United States Patent
Buggenthin et al.

(10) Patent No.: US 12,145,318 B2
(45) Date of Patent: Nov. 19, 2024

(54) METHOD AND APPARATUS FOR MONITORING A QUALITY OF AN OBJECT OF A 3D-PRINT-JOB SERIES OF IDENTICAL OBJECTS

(71) Applicant: Siemens Aktiengesellschaft, Munich (DE)

(72) Inventors: Felix Buggenthin, Munich (DE); Siegmund Düll, Munich (DE); Mitchell Joblin, Munich (DE); Clemens Otte, Munich (DE); Axel Reitinger, Munich (DE); Victor Balanica, Ingolstadt (DE); Michael Caelers, Norrköping (SE); Jonas Eriksson, Finspong (SE); Jerry Fornander, Finspong (SE); Andreas Graichen, Finspang (SE); Vincent Sidenvall, Örkelljunga (SE)

(73) Assignee: Siemens Aktiengesellschaft, Munich (DE)

( * ) Notice: Subject to any disclaimer, the term of this patent is extended or adjusted under 35 U.S.C. 154(b) by 100 days.

(21) Appl. No.: 16/650,754

(22) PCT Filed: Sep. 19, 2018

(86) PCT No.: PCT/EP2018/075277
§ 371 (c)(1),
(2) Date: Mar. 25, 2020

(87) PCT Pub. No.: WO2019/063370
PCT Pub. Date: Apr. 4, 2019

(65) Prior Publication Data
US 2020/0230884 A1    Jul. 23, 2020

(30) Foreign Application Priority Data
Sep. 26, 2017 (EP) ..................... 17193155

(51) Int. Cl.
*B29C 64/393* (2017.01)
*B22F 10/28* (2021.01)
(Continued)

(52) U.S. Cl.
CPC ............ *B29C 64/393* (2017.08); *B22F 10/80* (2021.01); *B22F 10/85* (2021.01); *B22F 12/90* (2021.01);
(Continued)

(58) Field of Classification Search
CPC . B29C 64/386; B33Y 50/00; G05B 19/41875; G05B 2219/31263; G05B 2219/32368; G05B 2219/35012
See application file for complete search history.

(56) References Cited

U.S. PATENT DOCUMENTS

| | | |
|---|---|---|
| 6,930,278 B1 | 8/2005 | Chung et al. |
| 2016/0054231 A1* | 2/2016 | Hess ................ G05B 19/41875 702/82 |

(Continued)

FOREIGN PATENT DOCUMENTS

| | | |
|---|---|---|
| CN | 103978684 A | 8/2014 |
| CN | 104197994 A | 12/2014 |

(Continued)

OTHER PUBLICATIONS

Office Action in related Chinese Patent Application No. 201880062651.X dated Apr. 30, 2021. 32 pages.
(Continued)

*Primary Examiner* — Darrin D Dunn
*Assistant Examiner* — Yvonne Trang Follansbee
(74) *Attorney, Agent, or Firm* — Schmeiser, Olsen & Watts LLP

(57) ABSTRACT

An apparatus and method for monitoring a quality of an object of a 3D-print job series of identical objects, each
(Continued)

object built from a multitude of stacked 2D-layers printed by a 3D-printer in an additive manufacturing process, including: determining a layer quality indicator of a currently printed layer of an object, comparing the determined layer quality indicator of the currently printed layer with a predetermined lower confidence limit of the layer, the predetermined lower confidence limit being calculated depending on layer quality indicators of previously completely manufactured objects complying with predefined quality requirements, and generating a warning signal, if the layer quality indicator of the currently printed layer has a value equal or lower than the lower quality limit is provided.

13 Claims, 4 Drawing Sheets

(51) Int. Cl.
 B22F 10/80 (2021.01)
 B22F 10/85 (2021.01)
 B22F 12/90 (2021.01)
 B29C 64/386 (2017.01)
 B33Y 50/00 (2015.01)
 G05B 19/418 (2006.01)

(52) U.S. Cl.
 CPC ............ B29C 64/386 (2017.08); B33Y 50/00 (2014.12); G05B 19/41875 (2013.01); B22F 10/28 (2021.01); G05B 2219/31263 (2013.01); G05B 2219/32368 (2013.01); G05B 2219/35012 (2013.01)

(56) References Cited

U.S. PATENT DOCUMENTS

| | | | |
|---|---|---|---|
| 2016/0098825 A1 | 4/2016 | Dave et al. | |
| 2016/0184893 A1 | 6/2016 | Dave et al. | |
| 2016/0228987 A1 | 8/2016 | Baudimont et al. | |
| 2018/0079125 A1* | 3/2018 | Perez | B29C 64/106 |
| 2018/0264553 A1* | 9/2018 | Dave | B29C 64/153 |
| 2018/0341248 A1* | 11/2018 | Mehr | G05B 13/048 |
| 2019/0054700 A1* | 2/2019 | Chandar | B33Y 50/02 |
| 2019/0079493 A1* | 3/2019 | Yang | G05B 19/4099 |
| 2020/0201292 A1* | 6/2020 | Cella | G05B 23/0221 |

FOREIGN PATENT DOCUMENTS

| | | |
|---|---|---|
| CN | 105555444 A | 5/2016 |
| CN | 105555509 A | 5/2016 |
| CN | 105619818 A | 6/2016 |
| CN | 106273477 A | 1/2017 |
| CN | 106863784 A | 6/2017 |
| CN | 106984813 A | 7/2017 |
| DE | 102015011013 A1 | 2/2016 |
| EP | 1634694 A2 | 3/2006 |
| WO | 2007147221 A1 | 12/2007 |
| WO | 2015020939 A1 | 2/2015 |
| WO | 2017085468 A1 | 5/2017 |

OTHER PUBLICATIONS

International Search Report and Written Opinion of International Searching Authority in related PCT International Application No. PCT/EP2018/075277 filed Sep. 19, 2018; mailed Oct. 26, 2018. 13 pages.

Extended European Search Report in related European Patent Application No. 17193155.3; mailed on Apr. 3, 2018. 7 pages.

"Confidence Limits: Definition", retrieved on May 14, 2024 from the Internet: <URL: https://www.statisticshowto.com/confidence-limits-definition/>.

* cited by examiner

METHOD AND APPARATUS FOR MONITORING A QUALITY OF AN OBJECT OF A 3D-PRINT-JOB SERIES OF IDENTICAL OBJECTS

CROSS-REFERENCE TO RELATED APPLICATIONS

This application claims priority to PCT Application No. PCT/EP2018/075277, having a filing date of Sep. 19, 2018, which is based off of EP Application No. 17193155.3, having a filing date of Sep. 26, 2017, the entire contents both of which are hereby incorporated by reference.

FIELD OF THE TECHNOLOGY

The following relates to a method, apparatus as well as a computer-program-product for monitoring a quality of an object of a 3D-print-job series of identical objects, each object built from a multitude of stacked 2D-layers printed by a 3D-printer in additive manufacturing process.

BACKGROUND

Additive manufacturing or layer based manufacturing is a cutting-edge part production process that starts with a modeling phase by segmenting a 3-dimensional (3D) object model generated by computer aided design methods into stacked 2-dimensional (2D) layers of different thickness and continues with the actual production phase by printing one layer upon a previous layer. In a powder bed fusion additive manufacturing process, one of several existing additive manufacturing processes, two alternating steps are performed. In a recoating step material powder is spread on a flat surface e.g. of a previously processed layer creating a so-called powder bed. In a subsequent exposure step the material powder is exposed and fused to the previous layer.

Depending on the height of the object and the layer thickness, the number of 2D-layers needed for the object is very big, e.g. thousands of layers, and the time needed to print all the layers can take several hours to days. Further on the printed objects must fulfill a very high quality level depending on the type and deployment of the object, for example in gas turbines.

Though very flexible in creating objects, the manufacturing process is affected by several issues like powder bed issues, insufficient thickness of powder in a powder bed after recoating, overheating during the melt process or insufficient gas flow needed to blow the dust out of the printer chamber. These issues can result in severe quality defects in the completely manufactured object or it can result in the termination of the print-job, if the issue is identified during the manufacturing process. In both cases the part has to be scrapped and significant print production time and material have been wasted. Especially in print-job series, printing the same objects many times, the manufacturing process should be optimized to identify objects of low quality as early as possible to prevent high amount of wasted material and time.

It is common practice that operators supervise the additive manufacturing process evaluating sensor data and images provided from different processing steps. This evaluation is usually based on the skill level and experience of the operator. Especially in high print-job series this evaluation is done by different operators resulting in varying evaluation and adaption results of the additive manufacturing process based on their different skill level and experience.

DE 10 2015 011 013 A1 discloses a quality assurance system for generative manufacturing which enables measurements of actual process status variables in combination with a generative manufacturing process. Such process variables define a possible process room, in which the manufacturing process can be judged as nominal, i.e. showing sufficient quality.

WO 2015/020939A1 discloses an automatic process control for additive manufacturing comprising at least one camera generating layer verification images, which are compared with a predictive render of the object. Verification involves edge detection, feature recognition and other computer vision techniques to determine how close the current print is to the predictive render.

SUMMARY

Therefore an aspect relates to providing objective criteria for evaluating the quality of the objects during printing to keep a constant quality level in 3D-print-job series taking into account the quality of each single layer and also all layers already printed in a practical and time efficient way. Additionally lower quality object shall be identified early in the printing process.

The expression "manufacturing process" and "printing process" as well as "manufactured layer" or "printed layer" are used as synonyms throughout this document.

An aspect relates to a method for monitoring a quality of an object of a 3D-print-job series of identical objects, built from a multitude of stacked 2D layers printed in a 3D printer in an additive manufacturing process, comprising the method steps of determining a layer quality indicator of a currently printed layer of an object, comparing the determined layer quality indicator of the currently printed layer with a predetermined lower confidence limit of the corresponding layer, the predetermined lower confidence limit being calculated depending on layer quality indicators of previously completely manufactured object complying with predefined quality requirements, and generating a warning signal, if the layer quality indicator of the currently printed layer has a value equal or below the lower quality limit. The layer quality indicator is determined by machine learning means.

With this method the quality of individual layers are considered already during the manufacturing process. Layers with insufficient layer quality indicator can be identified and measures can be taken early as a warning signal indicates them instantaneously. The criteria indicating a layer as having an essential issue is provided by a layer quality indicator calculated under the same conditions during former print-jobs of identical objects having the same shape, number of layers and being manufactured by the same 3D printer, for which the completely manufactured object was evaluated as compliant with predefined quality requirements.

In an exemplary embodiment the lower confidence limit is determined for each object out of a subset of objects of the print-job series, by determining a layer quality indicator for each printed layer of the object, determining an object quality indicator for the completely manufactured object based on the layer quality indicators of all printed layers of the completely manufactured object and calculating a lower confidence limit for each layer depending on the layer quality indicators of those objects having an object quality indicator complying with the predefined quality requirements.

This has the advantage that each single layer indicator relies on the quality of the corresponding layer of objects being rated as "compliant objects", i.e. completely manufactured objects which comply with predefined quality requirement. The lower confidence limit is a numerical value for example providing a probability that the layer provides a quality which leads to an sufficient overall quality of the completely manufactured object.

In an exemplary embodiment at least one of the completely manufactured objects of the subset is inspected by material analytic means to confirm the calculated object quality indicator complying with the predefined quality requirements.

The confirmation of the actual quality of the completely manufactured object by material analytic means provides a reliable basis for classifying the determined sequence of layer quality indicators for all layers of the object to a "compliant" object complying with the predefined quality requirements. As bigger the number of inspected completely manufactured object is, as more reliable are the determined layer quality indicator sequences.

In an exemplary embodiment the lower confidence limit is recalculated taking into account the layer quality indicators of each further completed manufactured object with an object quality indicator complying with the predefined quality requirements.

This has the advantage that also the determination of the lower confidence limit is based on a growing number of layer quality indicators of compliant completely manufactured objects and can therefore be refined with each additional completely manufactured object complying with the predefined quality requirements.

In an exemplary embodiment an upper confidence limit and the lower confidence limit are provided by a standard deviation calculated depending on the layer quality indicator for each layer of completely manufactured objects complying with the predefined quality requirements of the object.

This means that the standard deviation is calculated of all or at least a subset of layer quality indicator sequences of completely manufactured objects complying with the predefined quality requirements, i.e. compliant objects.

The object quality indicator may be determined by machine learning means.

Machine learning means are algorithms based on data classified by learning algorithms wherein the learning algorithms are based on training data which is already labeled as belonging to one of the classifications assigned in the classification algorithm. Using machine learning means has the advantage that the quality indicators can be determined automatically without an evaluation by an operator, after the machine learning algorithm has been successfully performed a training phase. In this training phase for a subset of at least more than one objects of the print-job series the layer quality indicator is determined for each layer resulting in a probability value for each layer quality. Additionally after finishing the print-job the completely manufactured object is examined with respect to its quality. An completely manufactured object is labeled as "compliant object", if complying with predefined quality requirements or it is labeled as "not compliant" object which does not comply with the predefined quality requirements. The lower and upper confidence limit are determined depending on all layer quality indicator sequences of completely manufactured objects labeled as "compliant" objects. Completely manufactured object of the subset used for training the machine learning algorithm are inspected by material analytic means to ascertain the quality of the completely manufactured object.

In a further embodiment at least one fault detection and prediction value is determined for each layer, each fault detection and prediction value depending on data of different data sources of the present additive manufacturing process and determining the layer quality indicator depending on all determined fault detection and prediction results.

It is the advantage that the layer quality indicator is based on data from different data sources representing different processing conditions and layer conditions. Therefore different influencing parameters to the manufacturing process are considered. The detection and predication value depends on data of different data sources which can be weighted or interconnected to each other representing the manufacturing process with different aspects.

In an exemplary embodiment data sources are at least one of a computer aided design model of the object, images of the additive manufacturing process, sensor data of the additive manufacturing process or settings of the additive manufacturing process.

Settings means the values of different components of a 3D-printer or the additive manufacturing process, e.g. settings influencing the amount of powder spread in the powder bed for building the next layer, the temperature setting of e.g. the meltpool, gas pressure settings and so on.

In an exemplary embodiment a warning signal is generated, if layer quality indicators of subsequent layers show a common trend towards the lower confidence limit.

This has the advantage that already before the lower confidence limit is reached countermeasures can be started to raise the layer quality of subsequent layers or to stop the complete printing process and scrap the partly printed object as early as possible.

In an exemplary embodiment the settings of the additive manufacturing process are automatically adjusted based on the generating warning signal.

This allows deriving measures based on a generated warning signal. Settings of the printing process can be changed e.g. automatically based on a warning signal.

A second aspect of the present invention is realized by an apparatus for monitoring a quality of an object of a 3D-print-job series of identical objects, each object built from a multitude of stacked 2D-layers printed by a 3D-printer in an additive manufacturing process, comprising at least one first processor configured to determine a layer quality indicator of a currently printed layer of an object, and comparing the determined layer quality indicator of the currently printed layer with a predetermined lower confidence limit of the layer, the predetermined lower confidence limit being calculated depending on layer quality indicators of previously completely manufactured objects complying with predefined quality requirements, and a signal generating unit configured to generate a warning signal, if the layer quality indicator of the currently printed layer has a value equal or lower than the lower quality limit.

The apparatus provides the advantage that an additive manufacturing process of a larger print-job series can be monitored automatically requiring layer quality indicator sequences of all layers of only a few completely manufactured objects which comply with the predefined quality requirements. These predefined quality requirements can be proven by inspecting a completely manufactured object based by material inspection means, especially non-destructive material inspection means.

In an exemplary embodiment the apparatus comprises at least a second processor which is configured to determine the lower confidence limit as described for the method.

In an exemplary embodiment the apparatus comprises an input unit configured to receive a confirmed object quality indicator of at least one of the completely manufactured objects of the subset from the material analytic means and/or to receive data of at least one of a computer aided design (CAD) model of the object, image data of the additive manufacturing process, sensor data and settings of the additive manufacturing process.

In an exemplary embodiment the signal generating unit is configured to generate a warning signal, if layer quality indicators of subsequent layers show a common trend towards the lower confidence limit.

In an exemplary embodiment the apparatus comprises an output unit configured to transmit warning signals to the 3D-printer.

A third aspect of the present invention concerns a computer program product (non-transitory computer readable storage medium having instructions, which when executed by a processor, perform actions).

BRIEF DESCRIPTION some of the embodiments will be described in detail, with reference to the following figures, wherein like designations denote like members, wherein.

DETAILED DESCRIPTION

Additive Manufacturing is a production process wherein 3-dimensional (3D) objects are produces by adding and fusing layers of material on top of each other, in contrast to common mechanical production like e.g. milling. The process is generally called additive manufacturing process or 3D-printing process. The production is based on digital 3D-models of the physical object and is therefore computer controlled. This so called computer-aided design, short CAD, is vector-based, since all 3D-objects can be characterized by using lines and points. A digital 3D-model, which is saved in a CAD-file, is converted into thin slices, the so called layers. The layer data are sent to the 3D-printer, which prints layer by layer on top of each other and that manufactures the 3D-object.

Figure 1:
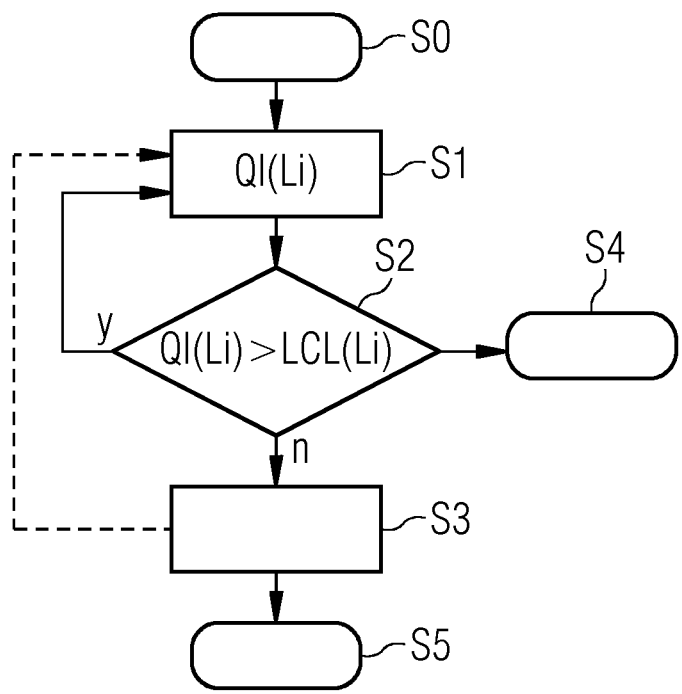
FIG. 1 depicts a flow diagram of an embodiment of a method.

The general idea of the monitoring method, shown in FIG. 1, is to determine a layer quality indicator $QI(Li)$, see step S1, which is calculated for each printed layer Li of a given CAD-model of an object automatically during the current printing print-job and compare it to a predefined lower confidence limit $LCL(Li)$ of the corresponding layer Li, see step S2, to allow early measures in the printing process by generating a warning signal, if the current layer quality indicator is equal or below a lower confidence limit, see step S3. The layer quality indicator is determined by the same machine learning functions and is used during the training phase S0. The predetermined lower confidence limit LCL (Li) is calculated, see step S0, depending on layer quality indicators determined for all layers of previously completely manufactured objects complying with predefined quality requirements.

Figure 3:
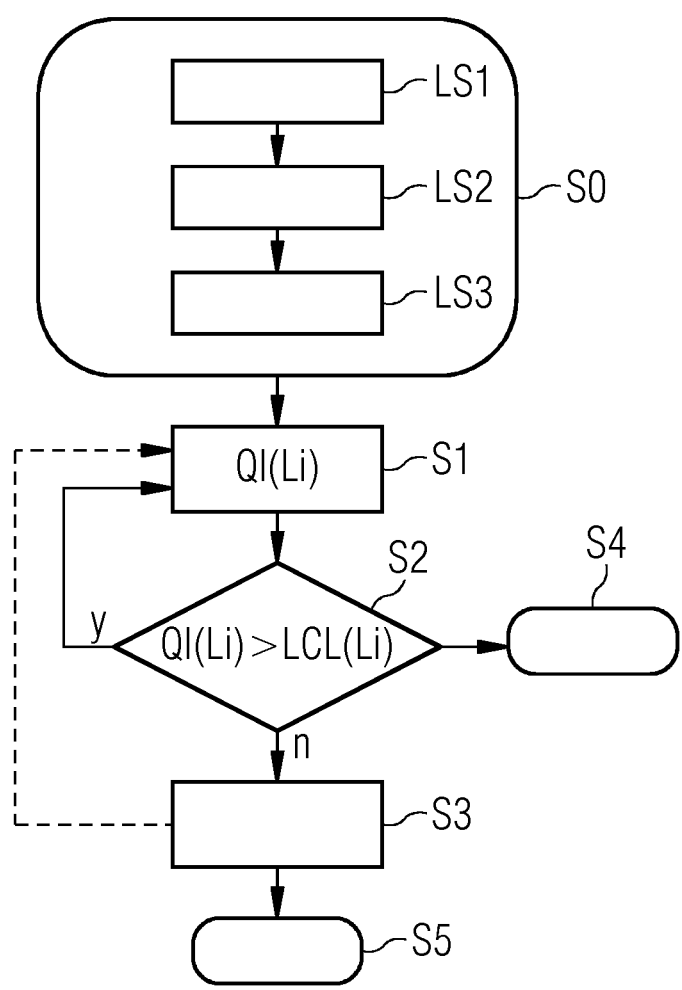
FIG. 3 depicts a second embodiment of the method with a training phase.
Figure 7:
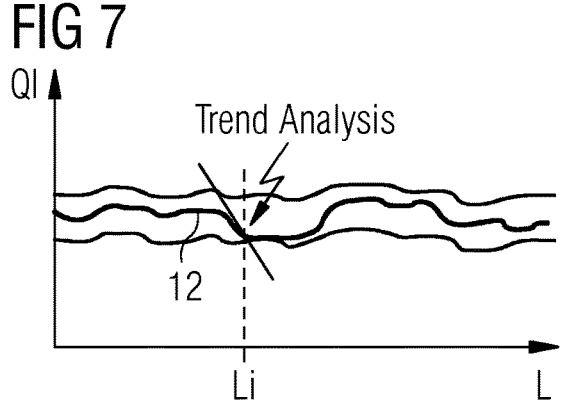
FIG. 7 depicts an embodiment of all layer quality indicators of a completely manufactured object with a trend analysis evaluation.

The training process step S0 is shown in detail in FIG. 3 and explained referring to a object 300 schematically depicted in FIG. 7. During the training step the lower confidence limit LCL is determined for each object out of a subset of more than one objects of the print-job series. For each printed layer L1, . . . , Ln of an object of this subset a layer quality indicator $QI(L1), \ldots QI(Ln)$ is determined, see step LS1. Subsequently an object quality indicator is determined for the completely manufactured object based on the layer quality indicators $QI(L1), \ldots QI(Ln)$ of all printed layers (L1, . . . , Ln) of the completely manufactured object, see step LS2. An upper confidence limit $UCL(L1), \ldots, UCL(Ln)$ and a lower confidence limit $LCL(L1), \ldots, LCL(Ln)$ is calculated for each layer L1, . . . , Ln depending on the layer quality indicators of those objects having an object quality indicator complying with predefined quality requirements, see step LS3.

The method ends in step S4, if all layers L1, . . . , Ln of the object 300 are printed and layer quality indicators $QI(L1), \ldots QI(Ln)$ are determined and evaluated. The method ends in step S5, if the print-job of the object is stopped before all layers L1, . . . , Ln are printed, e.g. as a consequence of a previous warning signal transmitted to the 3D-printer.

The printing process of each further object of a 3D-print-job series corresponding to the same CAD-model can now be evaluated in comparison to the previously determined sequences of layer quality indicators determined either in a dedicated training phase or determined continuously taking into account further sequence of layer quality indicators of a completely manufactured compliant object complying to predefined quality requirements of the object.

Figure 2:
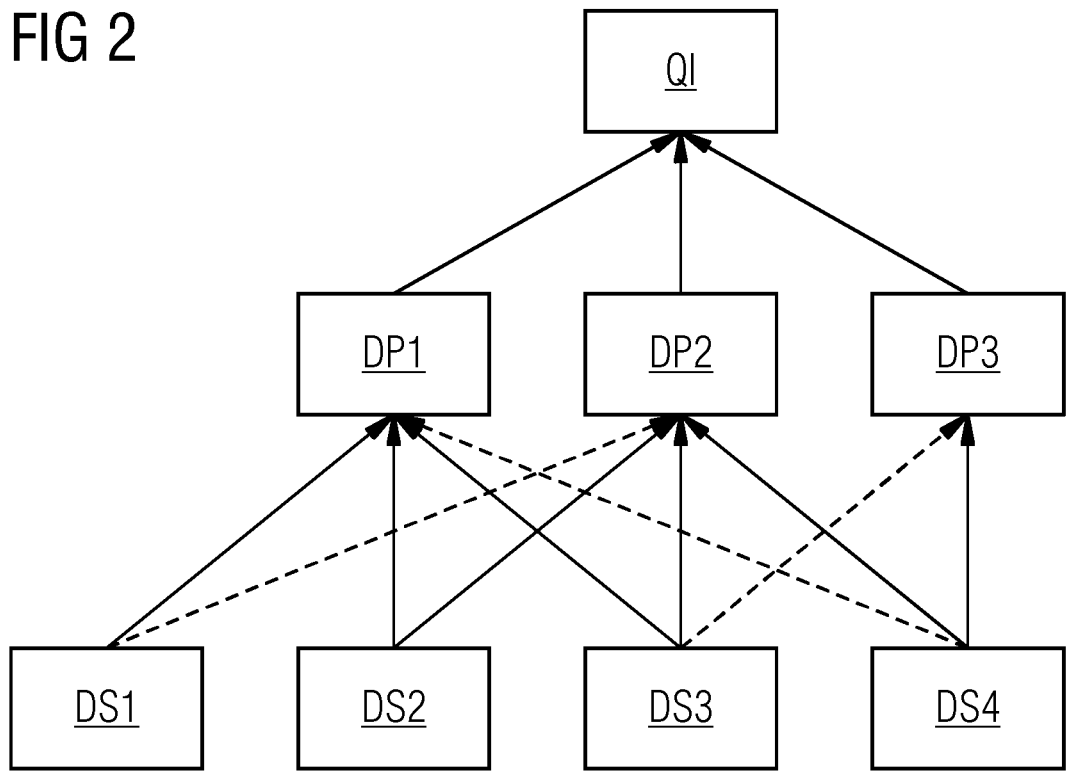
FIG. 2 depicts a schematic diagram of a hierarchy and systematic determination of the layer quality indictors.

The layer quality indicator is determined in a two step approach, as shown in FIG. 2, by machine learning techniques, e.g. random forests, neural networks, Markov-Models or Gaussian classification. At least one, or several, detection and prediction values DP1, DP2, DP3 are calculated by a machine learning method based on different data sources. Data sources are e.g. the CAD-model of the object DS1, images from a power bed camera D2, time line data DS3 of sensors e.g. detecting a temperature and pressure of a melt pool or further process parameters D4 of the printing process. The data DS1, DS2, DS3 and DS4 of different data sources are also called multimodal data. Examples for multimodalities are powder-bed images, Meltpool images, time series sensor data and CAD data. The detection and prediction value is an indicator that a specific layer causes issues for the overall printed object. The usage of different multimodal data increases the reliability for detection of different type of issues or errors during the manufacturing process.

In a second step the detection and prediction results DP1, DP2, DP3 are aggregated into one value which is the layer quality indicator QI.

The layer quality indicator is a numerical value providing a probability for a layer contributing to a completely manufactured object complying with a predefined required quality. The numerical value can provide a percentage in the range between 0 and 100 or can be between the value 0 to 1 or normalized to any other interval. The layer quality indicator QI(Li) can be aggregated depending on the single detection and prediction values DP1(Li), DP2(Li), DP3(Li) of the layer Li, e.g. by taking a minimum value of all detection and prediction values DP1(Li), DP2(Li), DP3(Li) or by multiplying weighted detection prediction values or an addition of weighted detection and prediction results, e.g. providing an aggregated value of all detection and prediction values DP1(Li), DP2(Li), DP3(Li).

A detection and prediction value DP(Li) as well as the layer quality indicator QI(Li) shown in FIG. 2 as a graph are defined by the equation:

$$DP_{Li} = f(DS1_{Li}, DS2_{Li}, \ldots, DS4_{Ln})$$

The layer quality indicator of a layer Li is $$QI(Li) = f(DP1_{Li}, \ldots, DP3_{Li}).$$

The detection and prediction values DP1, . . . , DP3 and the layer quality indicator QI are calculated for each layer of an object of the print-job series.

Figure 4:
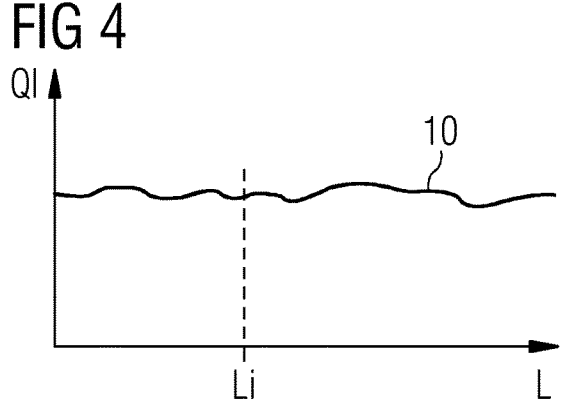
FIG. 4 depicts an example of layer quality indicators for all layers of an object of the print-job series.
Figure 5:
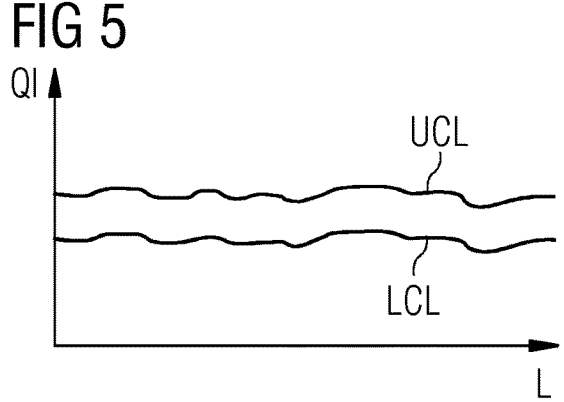
FIG. 5 depicts an upper and a lower confidence limit for all layers of an object of the print-job series.

FIG. 4 shows a sequence 10 of layer quality indicators for all layers L1, . . . , Ln one object 300 of the 3D-print-job series. For each of the layers L1, . . . , Ln one layer quality indicator QI(L1), . . . QI(Ln) is determined and shown as a function of the layers L of an object. As an example the layer quality indicator QI(Li) of a Layer Li is marked in FIG. 4.

A graph of layer quality indicator QI(L1), . . . QI(Ln) of all layers ordered by consecutive layers, also called a sequence of layer quality indicators and shown in FIG. 4, can be evaluated for the first printed object of a given CAD-model and every following object in new print-job of this print-job series. During the training phase a subset of objects of the print-job series these layer quality indicator is determined for each printed layer of an object. For the completely manufactured object an object quality indicator is determined based on the layer quality indicator of all printed layers after a print-job is finished. Additionally for the completely manufactured objects of the subset an evaluation of the quality of the object is performed by non-destructive inspection means to evaluate if the object needs the required features and therefore the required quality. If this is the case the sequence of layer quality indicator 10 as shown in FIG. 4 is used for calculating an upper and lower confidence limit.

For all these layer quality indicator sequences 10 of objects complying with the quality requirements a standard deviation of the quality indicator is calculated. E.g. the upper and lower quality limit is evaluated by adding or subtracting one or several times the standard deviation to the mean value of all considered layer quality indicator graphs for each individual layer. If a determined layer quality indicator QI(Li) for layer Li lies in a value range between the upper confidence layer UCL and the lower confidence limit LCL, the quality of the considered layer leads with a certain confidence to an completely manufactured object complying with the quality requirements.

The more objects of the 3D-print-job series are used for training the learning function to evaluate the detection and prediction results as higher is the probability that the detection and prediction value DP1, DP2, DP3 is correct.

Also after the training phase the upper and lower confidence limit, UCL and LCL, can be refined by evaluating a mean layer quality on all layer quality indicator sequences so far determined complying with the predefined quality requirements. This means that each layer quality indicator sequence of a completely manufactured object within determined object quality indicator complying to the quality requirements is included into the sample of considered layer quality indicator sequences. Accordingly the upper confidence limit UCL and the lower confidence limit LCL can be recalculated depending on the new number of layer quality indicator sequences complying to the predefined quality requirements.

Figure 6:
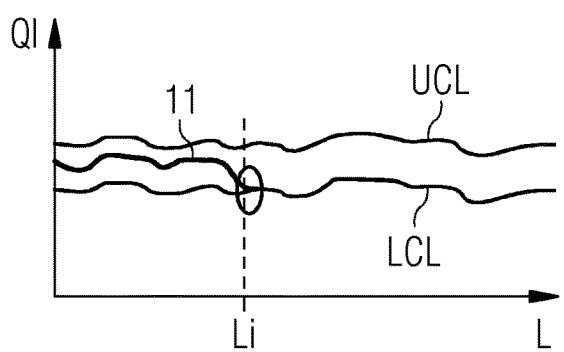
FIG. 6 depicts an embodiment of a layer quality indicator determined for a currently printed object in relation to the upper and lower confidence limit previously determined.

During a current printing process of a layer Li the layer quality indicator QI(Li) is determined according to step S1 as shown in FIG. 1 and FIG. 3. In a further step S2 the determined layer quality indicator QI(Li) of the currently printed layer is compared with a predetermined lower confidence layer LCL(Li) of the corresponding layer Li. If the layer quality indicator QI(Li) is above the lower confidence limit LCL the value is stored and the same process is performed for the next layer. If the layer quality indicator is equal or below the lower confidence limit a warning signal is generated, see step S3, and transmitted to the additive manufacturing process. Such a sequence of quality indicators 11 is shown in FIG. 6. Here the layer quality indicator QI(L1, . . . , Li−1) of the layers L1, . . . , Li−1, marked with reference sign 11, show the value between the upper and the lower confidence layer UCL, LCL. At layer Li the layer quality indicator QI(li) is lower than the lower confidence layer LCL(Li) and accordingly a warning signal is generated.

In case the determined layer quality indicator Li shows a value above the upper confidence layer a warning signal can also be generated. In this case the warning signal can be used to adapt the settings of the manufacturing process e.g. by lowering the amount of material powder for this layer as this high confident layer indicates that the present settings for the layer can be optimized e.g. to save material.

Further a trend analysis can be performed taking into account not only the layer quality indicator QI(Li) of the currently printed layer Li, but also a subset of preceding layer quality indicators 12 of preceding layers, see FIG. 7. If the layer quality indicators of the subset of layers already show a gradient value below a certain value a warning signal will also be generated.

The warning value can trigger different actions. E.g. parameter settings of the additive manufacturing process can be adjusted. Especially early warnings from a trend analysis may lead to an adaption of the setting of the 3D-printer. This can lead to a healing of an issue occurred in layer Li by subsequent layers printed with adapted settings. Therefore a self-healing process without any interaction of an operator can be achieved. The layer quality is continuously monitored in this way until the last layer of the object is printed and a completely manufactured object is created. For each of these completely manufactured objects the sequence of layer quality indicator values is determined and stored.

Besides an automatic adaption of settings, the warning signal can be sent to a supervision monitor to inform an operator, that the print process for each a boundary conditions if no interaction will be started.

Figure 8:
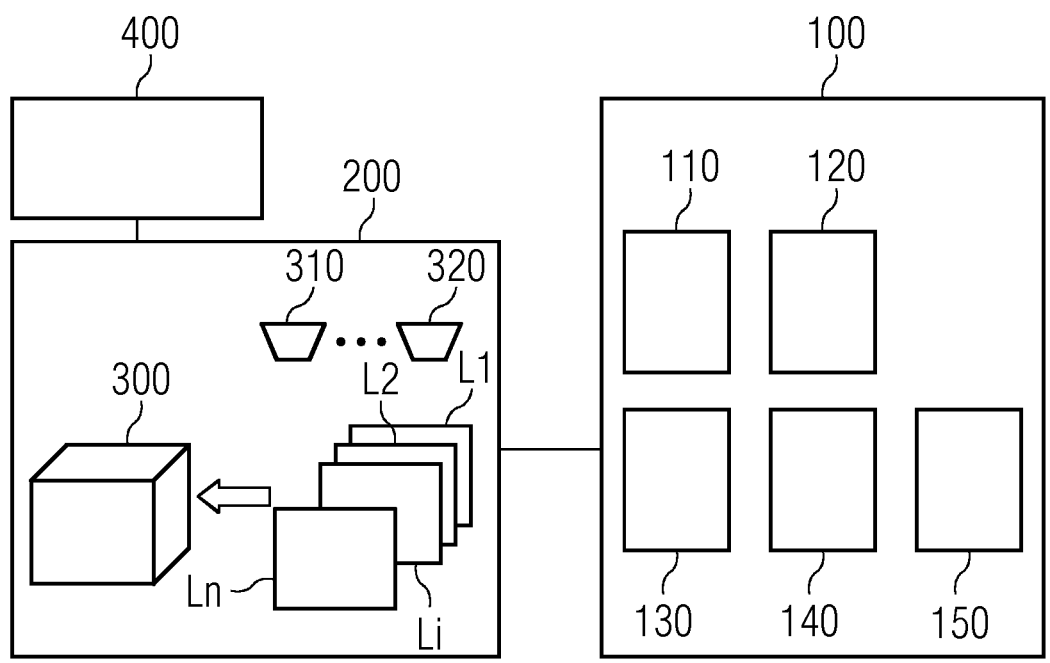
FIG. 8 depicts an embodiment of the inventive apparatus connected to a 3D-printer in schematic view.

A monitoring apparatus performing the described method is shown in FIG. 8. The monitoring apparatus 100 comprises a first processor 110 configured to determine a layer quality indicator QI of a currently printed layer. The first processor 110 is also configured to compare the determined layer quality indicator QI(Li) of the currently printed layer Li with a predetermined lower confidence limit LCL of the corresponding layer evaluated during the training phase S0.

The monitoring apparatus comprises further at least a second processor 130 configured to perform the training phase, which is to perform the steps LS1, LS2 and LS3 of the training phase as serial as shown in FIG. 3.

Further on a signal generating unit 120 is included and configured to generate the warning signal. Further on an input unit 140 is configured to receive data from the different data sources, e.g. a camera 310 or a sensor 320 of a 3D-printer 200. The input unit 140 is also configured to receive data from a material analytic means 400 which provide measured information on the object quality indicator based on a non-destructive material analytic method. The material inspection means 400 may provide information to the monitoring apparatus 100 via the 3D-printer 200 or it might be connected directly to monitoring apparatus 100. The 3D-printer 200 shows schematically printed layer L1, . . . , Ln, which form a completely manufactured object 300.

All methods and method steps can be implemented by corresponding means which are adapted for performing the respective method steps. All functions provided by particular means can be a method step of the method.

The scope of protection is given by the claims and not restricted by features discussed and the description as shown in the figures.

The present invention is not limited to the described example. The present invention also comprises all combinations of any of the described or depicted features.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for monitoring a quality of an object of a 3D-print job series of identical objects, each object built from a multitude of stacked 2D-layers printed by a 3D-printer in an additive manufacturing process, the method comprising:
    determining a layer quality indicator of a currently printed layer of the object, wherein the layer quality indicator is calculated under same conditions during former print jobs of identical objects having a same shape and a number of layers, for which a completely manufactured object was evaluated;
    comparing the layer quality indicator of the currently printed layer with a predetermined lower confidence limit of a corresponding layer, the predetermined lower confidence limit being calculated depending on layer quality indicators of previously completely manufactured objects complying with predefined quality requirements;
    performing a trend analysis taking into account the layer quality indicator of the currently printed layer and a subset of preceding layer quality indicators of preceding layers in a sequence of layer quality indicators for all layers of the object;
    generating an early warning signal before a value of the layer quality indicator of the currently printed layer is equal to or lower than a lower quality limit, in response to the trend analysis showing that the subset of preceding layer quality indicators is trending toward the predetermined lower confidence limit;
    in response to the early warning signal, automatically adjusting a setting of the 3D-printer to raise a layer quality of subsequent layers, or stopping the additive manufacturing process before completion of the object;
    generating a warning signal, in response to the layer quality indicator of the currently printed layer having a value equal or lower than the lower quality limit or in response to layer quality indicators of subsequent layers showing a common trend towards the lower confidence limit; and
    in response to the warning signal, automatically adjusting parameter settings of the additive manufacturing process to raise the layer quality of subsequent layers;
    determining the layer quality indicator of the currently printed layer by machine learning means.

2. The method according to claim 1, wherein the lower confidence limit is determined by:
    for each object out of a subset of objects of the print job series,
    determining a layer quality indicator for each printed layer of an object;
    determining an object quality indicator for the completely manufactured object based on the layer quality indicators of all printed layers of the completely manufactured object; and
    calculating a lower confidence limit for each layer depending on the layer quality indicators of those objects having an object quality indicator complying with predefined quality requirements.

3. The method according to claim 1, wherein at least one of the completely manufactured objects of the subset is inspected by material analytic means to confirm the calculated object quality indicator meeting the predefined quality requirements.

4. The method according to claim 1, wherein the lower confidence limit is re-calculated taking into account the layer quality indicators of each further completely manufactured object with an object quality indication complying with the pre-defined quality requirements.

5. The method according to claim 1, wherein an upper confidence limit and the lower confidence limit are provided by a standard deviation calculated depending on the layer quality indicator for each layer of completely manufactured objects complying with the predefined quality requirements of the object.

6. The method according to claim 1, the method comprising:
    determining at least one fault detection and prediction value for each layer, wherein each fault detection and prediction value depends on data of different data sources of the present additive manufacturing process; and
    determining the layer quality indicator of each layer depending on all fault detection and prediction values that have been determined for said each layer.

7. The method according to claim 6, wherein the different data sources include images of the additive manufacturing process, sensor data from the additive manufacturing process, and settings of the additive manufacturing process.

8. The method according to claim 6, wherein a total number data sources is at least 2, and wherein the at least one fault detection and prediction values determined for one layer includes: a first fault detection and prediction value that depends on data of all of the data sources and a second fault detection and prediction value that depends on data of at least one but not all of the data sources.

9. A computer program product, comprising a computer readable hardware storage device having computer readable program code stored therein, said program code executable by a processor of a computer system to implement the method of claim 1.

10. An apparatus for monitoring a quality of an object of a 3D-print job series of same objects, each object built from a multitude of stacked 2D-layers printed by a 3D-printer in an additive manufacturing process, the apparatus comprising:
   one or more processors configured to:
      determine a layer quality indicator of a currently printed layer of an object, wherein the layer quality indicator of the currently printed layer is calculated under same conditions during former print jobs of identical objects having a same shape and a number of layers, for which a completely manufactured object was evaluated;
      comparing the determined layer quality indicator of the currently printed layer with a predetermined lower confidence limit of the corresponding layer, the predetermined lower confidence limit being calculated depending on layer quality indicators of previously completely manufactured objects complying with predefined quality requirements; and
      perform a trend analysis taking into account the layer quality indicator of the currently printed layer and a subset of preceding layer quality indicators of preceding layers in a sequence of layer quality indicators for all layers of the object;
      generate an early warning signal before a value of the layer quality indicator of the currently printed layer is equal to or lower than a lower quality limit, in response to the trend analysis showing that the subset of preceding layer quality indicators is trending toward the predetermined lower confidence limit;
      in response to the early warning signal, automatically adjust a setting of the 3D-printer to raise a layer quality of subsequent layers, or stopping the additive manufacturing process before completion of the object;
      generate a warning signal, in response to the layer quality indicator of the currently printed layer having a value equal or lower than the lower quality limit or in response to layer quality indicators of subsequent layers showing a common trend towards the lower confidence limit; and
      in response to the warning signal, automatically adjust parameter settings of the additive manufacturing process to raise the layer quality of subsequent layers;
      determine the layer quality indicator of the currently printed layer by machine learning means.

11. The apparatus according to claim 10, wherein the one or more processors are further configured to determine the lower confidence limit by:
   for each object out of a subset of objects of the print job series,
   determining a layer quality indicator for each printed layer of an object;
   determining an object quality indicator for the completely manufactured object based on the layer quality indicators of all printed layers of the completely manufactured object; and
   calculating a lower confidence limit for each layer depending on the layer quality indicators of those objects having an object quality indicator complying with predefined quality requirements.

12. The apparatus according to claim 11, wherein the one or more processors are further configured to receive a confirmed object quality indicator of at least one of the completely manufactured objects of the subset from a material analytic means and/or to receive data of at least one of Computer Aided Design model of the object, image data of the additive manufacturing process, sensor data and settings of the additive manufacturing process.

13. The apparatus according to claim 10, wherein the one or more processors are further configured to transmit warning signals to the 3D-printer.

* * * * *